(12) United States Patent
Alsman et al.

(10) Patent No.: US 11,146,136 B2
(45) Date of Patent: Oct. 12, 2021

(54) BUS BAR ASSEMBLY FOR ELECTRIC MACHINE WINDING

(71) Applicant: BorgWarner Inc., Auburn Hills, MI (US)

(72) Inventors: Ian N. Alsman, Indianapolis, IN (US); Christopher Bledsoe, Anderson, IN (US); Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 155 days.

(21) Appl. No.: 16/681,423

(22) Filed: Nov. 12, 2019

(65) Prior Publication Data

US 2021/0143698 A1  May 13, 2021

(51) Int. Cl.

| | |
|---|---|
| H02K 3/28 | (2006.01) |
| H02K 3/12 | (2006.01) |
| H02K 3/38 | (2006.01) |
| H02K 3/52 | (2006.01) |
| H02K 5/22 | (2006.01) |
| H02K 3/50 | (2006.01) |

(52) U.S. Cl.
CPC ............... *H02K 3/28* (2013.01); *H02K 3/12* (2013.01); *H02K 3/38* (2013.01); *H02K 3/50* (2013.01); *H02K 3/522* (2013.01); *H02K 5/225* (2013.01); *H02K 2203/09* (2013.01)

(58) Field of Classification Search
CPC ........ H02K 2203/09; H02K 3/28; H02K 3/50; H02K 3/522; H02K 5/225
See application file for complete search history.

(56) References Cited

U.S. PATENT DOCUMENTS

| | | | |
|---|---|---|---|
| 6,445,097 B1 * | 9/2002 | Zeiler | H02K 5/148 310/71 |
| 8,546,986 B2 * | 10/2013 | Marchitto | H02K 3/521 310/71 |
| 8,716,910 B2 | 5/2014 | Edrington | |
| 9,660,495 B2 * | 5/2017 | Brzuska | H02K 3/38 |
| 9,768,655 B2 | 9/2017 | Neet | |
| 9,941,762 B2 | 4/2018 | Tamura | |
| 9,954,408 B2 | 4/2018 | Nakamura et al. | |
| 10,153,674 B2 * | 12/2018 | Tsuiki | H02K 3/28 |
| 10,256,693 B2 * | 4/2019 | Jang | H02K 3/28 |
| 10,298,083 B2 | 5/2019 | Okamoto et al. | |
| 10,892,658 B2 * | 1/2021 | Jang | H02K 3/522 |
| 10,998,789 B2 * | 5/2021 | Tategata | H02K 3/505 |
| 2009/0127948 A1 | 5/2009 | Shimizu et al. | |

(Continued)

*Primary Examiner* — Robert W Horn
(74) *Attorney, Agent, or Firm* — Maginot, Moore & Beck, LLP

(57) ABSTRACT

An electric machine includes a stator assembly and a bus bar assembly. The stator assembly includes a core with windings positioned on the core. The windings include in-slot portions, end turns, and leads. The leads extend from the in-slot portions at one of the ends of the core with ends of the leads extending axially past the end turns. The leads include a first plurality of leads positioned on a first side of the stator opposite a second plurality of leads positioned on a second side of the stator. The bus bar is substantially circular in shape and positioned radially inward from the end turns. The bus bar assembly includes three bus bars, each bus bar connecting at least one of the first plurality of leads to at least one of the second plurality of leads.

23 Claims, 9 Drawing Sheets

(56) References Cited

U.S. PATENT DOCUMENTS

| | | |
|---|---|---|
| 2017/0310183 A1 | 10/2017 | Jang et al. |
| 2019/0157934 A1* | 5/2019 | Kawaguchi .............. H02K 3/38 |
| 2021/0135531 A1* | 5/2021 | Iga .......................... H02K 3/522 |
| 2021/0143698 A1* | 5/2021 | Alsman .................... H02K 3/28 |
| 2021/0143699 A1* | 5/2021 | Alsman .................... H02K 3/28 |

* cited by examiner

BUS BAR ASSEMBLY FOR ELECTRIC MACHINE WINDING

FIELD

This application relates to the field of electric machines, and more particularly, winding arrangements and terminal connections for electric machines.

BACKGROUND

Electric machines are typically designed to meet specific operating requirements and space constraints. Examples of design features that contribute to operating performance include stator size, rotor size, type and arrangement of the of windings, number of stator slots, number of poles, slots per pole per phase, number of conductors per slot, number of parallel paths per phase, number of turns, and any of various other design parameters as will be recognized by those of ordinary skill in the art. All operating requirements for the electric machine must be met while also meeting certain space constraints that are dependent upon the application for the electric machine. For automotive applications, space within the engine compartment is limited, and designers must be concerned with the overall diameter and length of the electric machine. Accordingly, limiting the size of an electric machine without sacrificing performance features is important.

A typical solution for limiting space requirements in electric machines is the nest phase leads from the winding near one another as they exit the stator core and provide all of the phase terminals in relatively close proximity. This nesting of the phase leads may advantageously reduce the routing necessary to make the phase connections and reduce the overall volume of the machine. However, in certain applications, nesting of phase leads can lead to an increase in stator length, and thus an increase in overall volume, since the phase leads must be routed over each other at the end turns. This is particularly true in those applications where the phase leads coming out of the winding are relatively far apart from one another (e.g., in some applications the phase leads extending from the winding are approximately 180° apart). In these applications, nesting of phase leads can often lead to a necessary increase in stator length in order to accommodate the routing of the phase leads.

It would be desirable to provide an electric machine with a reduced length for those applications wherein the phase leads extending from the winding are relatively far apart. It would also be advantageous if such an electric machine could be utilized in various power applications, such as various electric and/or hybrid-electric vehicle applications. It would be of further advantage if such an electric machine could be easily manufactured, thus reducing manufacturing time and costs. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, an electric machine comprises a stator assembly and a bus bar assembly. The stator assembly includes a core with windings positioned on the core. The windings include in-slot portions, end turns, and leads. The in-slot portions of the windings are positioned in slots of the core. The end turns extend from the in-slot portions at ends of the core. The leads extend from the in-slot portions at one of the ends of the core with ends of the leads extending axially past the end turns. The leads include a first plurality of leads positioned on a first side of the stator substantially opposite a second plurality of leads positioned on a second side of the stator. The bus bar is substantially circular in shape and positioned radially inward from the end turns. The bus bar assembly includes three bus bars, each bus bar connecting at least one of the first plurality of leads to at least one of the second plurality of leads.

In accordance with another embodiment of the disclosure, a bus bar assembly for an electric machine comprises a first bus bar, a second bus bar, and a third bus bar. The first bus bar includes an arc member, a first phase terminal, a first lead connector, and a second lead connector. The second bus bar is similar to the first bus bar and includes an arc member, a second phase terminal, a first lead connector, and a second lead connector, wherein the arc member of the second bus bar is concyclic with the arc member of the first bus bar. The third bus bar includes an arc member, a third phase terminal, a first lead connector, and a second lead connector, wherein the arc member of the third bus bar is radially separated from but concentric with the arc members of the first bus bar and the second bus bar.

In accordance with yet another embodiment of the disclosure a bus bar assembly for an electric machine comprises a first bus bar, a second bus bar, and a third bus bar. The first bus bar includes an arc member, a first phase terminal, a first lead connector, and a second lead connector, wherein the first lead connector is provided on a first end of the arc member and extends radially outward from the arc member, the second lead connector is provided on a second end of the arc member and extends radially outward from the arc member, and the first phase terminal extends axially from the arc member between the first lead connector and the second lead connector. Similar to the first bus bar, the second bus bar also includes an arc member, a second phase terminal, a first lead connector, and a second lead connector, wherein the first lead connector is provided on a first end of the arc member and extends radially outward from the arc member, the second lead connector is provided on a second end of the arc member and extends radially outward from the arc member, and the second phase terminal extends axially from the arc member between the first lead connector and the second lead connector. The arc member of the second bus bar is concyclic with the arc member of the first bus bar. The third bus bar includes an arc member, a third phase terminal, a first lead connector, and a second lead connector, wherein the first lead connector is provided on a first end of the arc member and extends radially outward from the arc member, the second lead connector is provided on a second end of the arc member and extends radially outward from the arc member, and the third phase terminal is provided on the second end of the arc member and extends axially from the arc member. The arc member of the third bus bar is concentric with the arc member of the first bus bar and the second bus bar.

The above described features and advantages, as well as others, will become more readily apparent to those of ordinary skill in the art by reference to the following detailed description and accompanying drawings. While it would be desirable to provide an electric machine with a stator winding arrangement that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
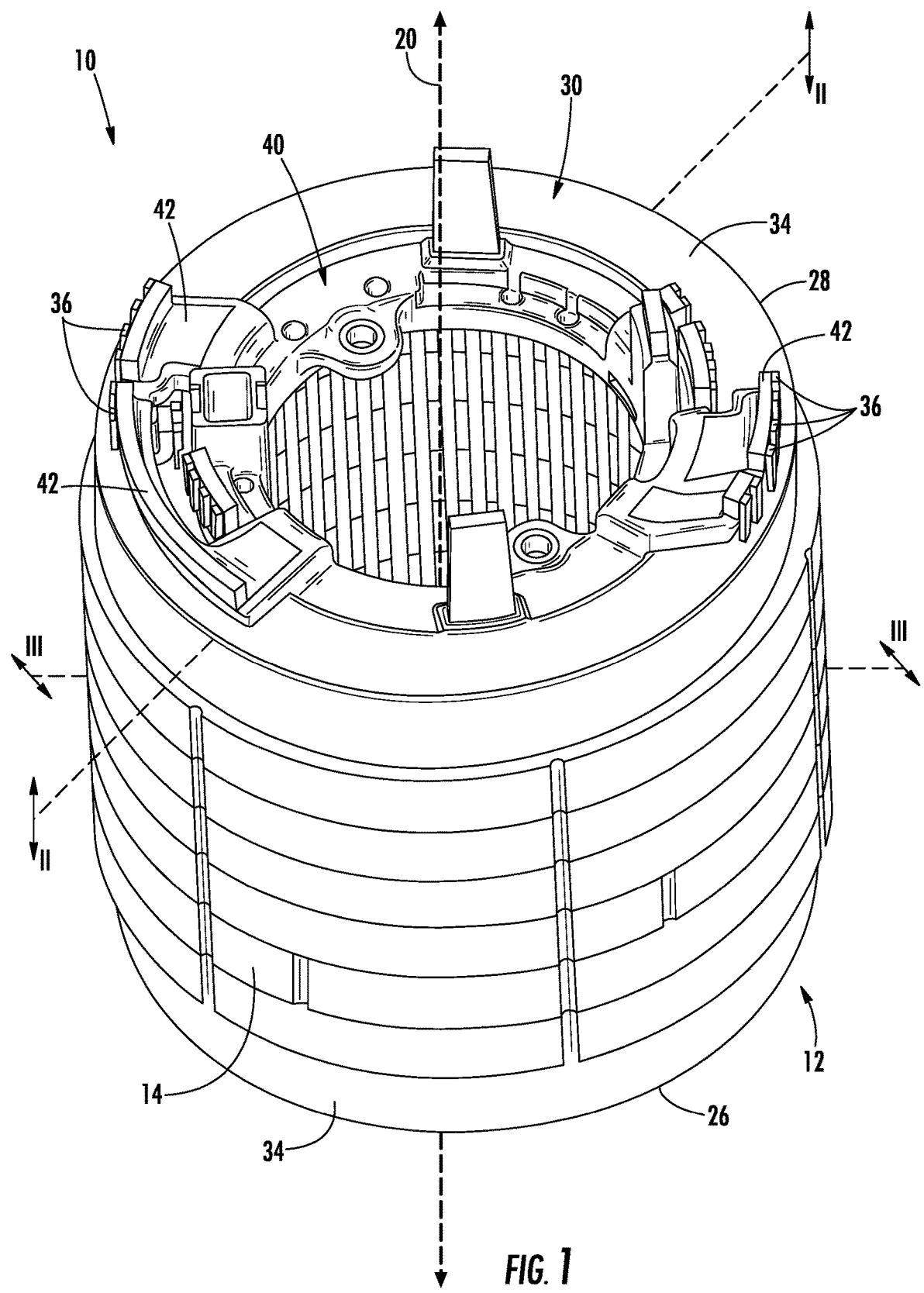
FIG. 1 shows a perspective view of an electric machine including a stator assembly and a bus bar assembly.

With reference to FIG. 1, an electric machine 10 includes a stator assembly 12 with a bus bar assembly 40 positioned thereon. The stator assembly 12 includes a stator core 14 with a winding arrangement 30 positioned on the stator core 14. A rotor of the electric machine (not shown) is configured to be rotatably mounted within the stator core 14. The winding arrangement 30 includes a plurality of phase windings, each of the phase windings terminating in one of a plurality of leads 36. The bus bar assembly 40 is provided at one end of the stator assembly 12 and electrically connected to the winding leads 36. As described herein, the bus bar assembly 40 includes a plurality of arc-shaped bus bars advantageously configured to reduce the overall length of the stator assembly.

Figure 2:
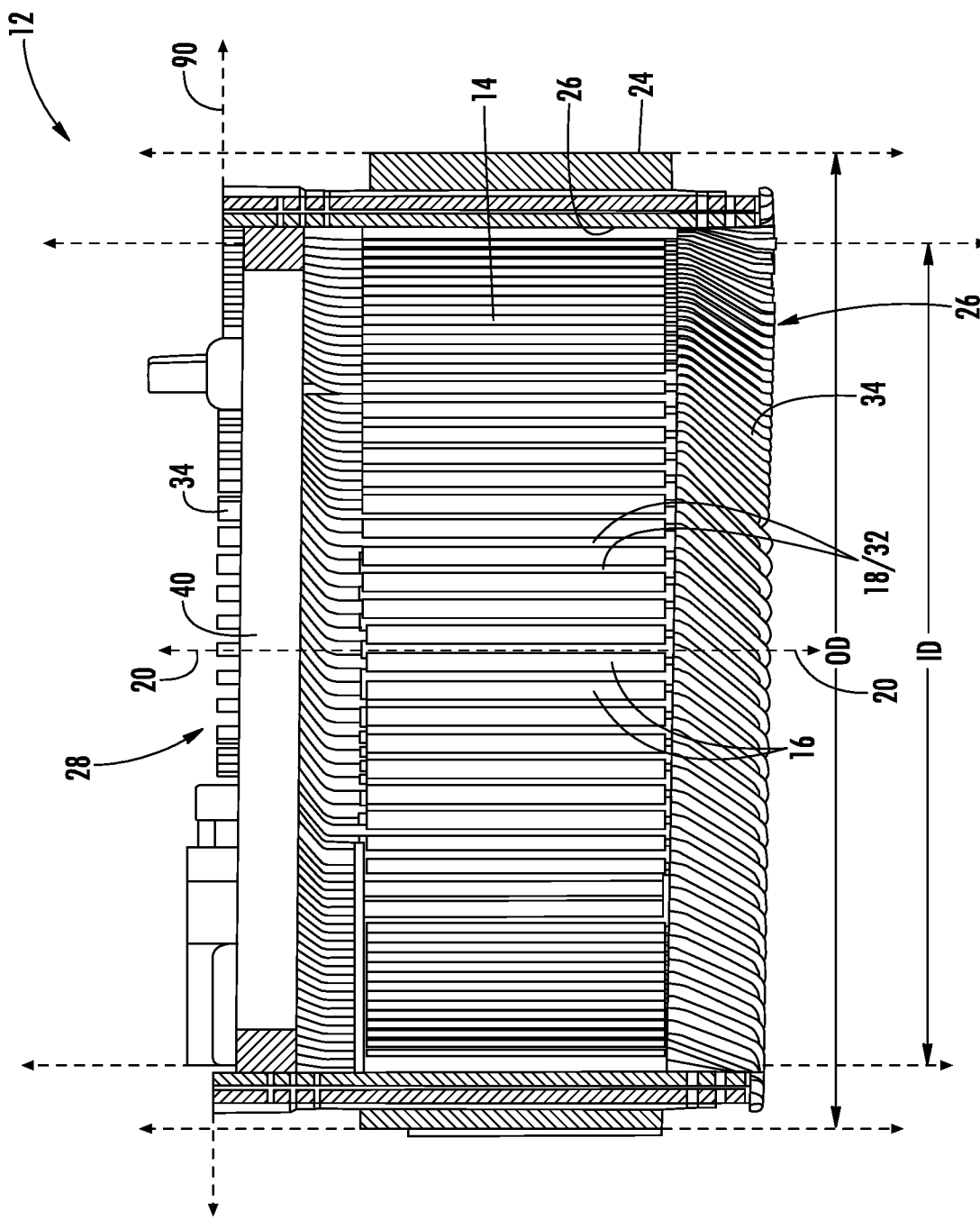
FIG. 2 shows a cutaway view of the stator assembly along plane II-II of FIG. 1.
Figure 3:
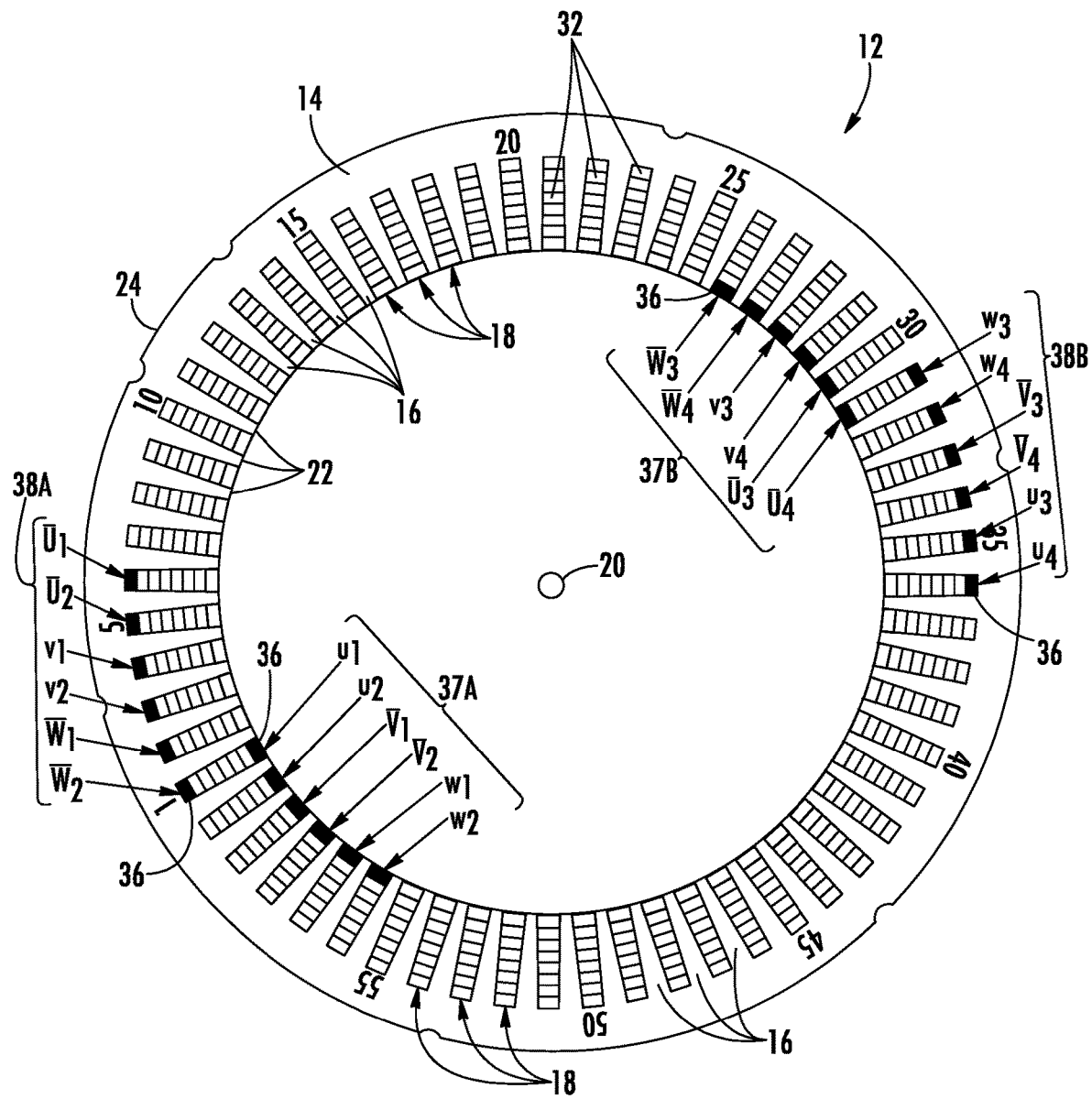
FIG. 3 shows cross-sectional view of the stator assembly alone plane III-III of FIG. 1.

With reference now to FIGS. 1-3, the stator assembly 12 includes both the stator core 14 and the winding arrangement 30. The stator core 14 is comprised of a ferromagnetic material and is typically formed from a plurality of steel sheets that are stamped and stacked upon one another to form a lamination stack. The stator core 14 is generally cylindrical in shape as defined by a center axis 20, and includes an inner perimeter surface 22 defining an inner diameter of the core, and an outer perimeter surface 24 defining an outer perimeter of the core. The inner perimeter surface 22 defines an inner diameter (ID) for the stator assembly 12. The outer perimeter surface 24 defines an outer diameter (OD) for the stator assembly 12. A plurality of teeth 16 are formed on the interior of the stator core 14 and directed inwardly toward the center axis 20. Each tooth 16 extends radially inward and terminates at the inner perimeter surface 22. Axial slots 18 are formed in the stator core 14 between the teeth 16.

The slots 18 may be open along the inner perimeter surface 22 of the stator core 14, or may be semi-closed slots with each slot 18 having a smaller width near the inner perimeter surface 22 than the width closer to the outer perimeter surface 24. Openings to the slots 18 are provided through the inner perimeter surface as well as through both ends of the stator core 14. Each slot 18 is defined between adjacent teeth 16, with two adjacent teeth forming two opposing radial walls for one slot.

The stator core 14 is configured to retain the winding arrangement 30 within the slots 18 of the stator core 14. In at least one embodiment, the winding arrangement 30 is formed from a plurality of elongated wires (e.g., copper wires) that are continuously wound within the slots 18 on the stator core 14 in order to form the windings. In at least one alternative embodiment, the winding arrangement 30 is formed from a plurality of segmented conductors, as is known to those of skill in the art. The segmented conductors are inserted into the slots 18 from a first end 26 (e.g., an "insertion end") of the stator core 14. The segmented conductors are connected together at an opposite end 28 (e.g., a "weld end") of the stator core 14.

The conductors of the completed winding arrangement 30 form a plurality of phase windings. In at least one embodiment, the winding arrangement includes three phase windings (e.g., phase U windings, phase V windings, and phase W windings) with multiple paths for each phase. The three phase windings may be star ("Y") or delta ("Δ") connected, depending on the desired winding configuration.

The conductors that form the completed windings on the stator core include in-slot portions 32, end turns 34, and winding leads 36. The in-slot portions 32 are straight portions of the conductors located within the slots 18 of the stator core 14. Each in-slot portion 32 carries current from one end 26/28 of the stator core 14 to the opposite end 28/26 of the stator core. As will be recognized by those of skill in the art, the in-slot portions 32 may be aligned in a single file line in each slot from, and each position in the line may be referred to a conductor "layer". As best shown in FIG. 3, in the exemplary winding disclosed herein, each slot 18 includes eight layers of conductors layers arranged in a single file line from an inner layer to an outer layer.

With continued reference to FIGS. 1-3, the end turns 34 are the conductor portions where a change of direction occurs outside of the slots 18 at an end of the stator core 14. As noted previously, the end turns 34 may include bent portions and/or welded portions of the conductors. Each end turn 34 includes a conductor that exits one slot at an end of the stator core 14, forms an end loop (e.g., a "U-turn" or other 180° change of direction), and enters a different slot on the same end of the stator core. As such, each end loop 34 extends between two in-slot portions 32 and across a number of slots at an end of the stator core 14. The end turns 34 are collectively represented in FIG. 1 by a disc-like shape at each end of the 26/28 of the stator core, but it will be recognized that the end turns are actually individual conductors having a similar shape at an end of the stator core 14, such as the conductors shown as the end turns 34 in FIG. 2.

The winding leads 36 are conductor portions that provide an entry/exit to one of the phase windings (or a branch of the phase winding). Each conductor forming a winding lead 36 is connected to an in-slot portion of the windings, and extends outward from the end turns 34. For example, as best shown in FIG. 1, each of the winding leads 36 extends in an axial direction past the end turns 34. In at least some embodiments, the winding leads may also have a radial or circumferential component. In any event, each winding lead 36 extends away from a slot and terminates at an end. That end of the lead is joined to one of the bus bars 42 of the bus bar assembly 40. It will be recognized that the connection between the leads 36 and the bus bars 42 may take any of various forms, such as soldering or welding (e.g., a tungsten inert gas (TIG) weld).

FIG. 3 shows the position of each winding lead relative to other conductors in the exemplary winding arrangement. In the winding of FIG. 3, the winding is a three-phase winding (e.g., a three-phase delta winding with phases U, W and V), each phase including four branches. Each branch of a phase is defined between two leads (i.e., one lead at each end of the branch), with each lead represented by a letter and a number in FIG. 3 (e.g., "$U_1$," "$u_2$," "$V_3$," "$v_4$," "$W_1$," "$w_2$" etc.). Because the winding is a three phase winding with four branches and 2 leads per branch, a total of twenty-four leads 36 are shown in FIG. 3 (i.e., 3×4×2=24). It will be recognized that there are generally four sets of leads, including two sets of inner leads 37A and 37B extending from an inner layer of the windings, and two sets of outer leads 38A and 38B extending from an outer layer of the windings. The term "inner layer" refers to any one of the layers located in the inner half of the layers and the term "outer layer" refers to any one of the layers located in the outer half of the layers. For example, for a stator winding having 8 layers; the "inner layer" is defined as the innermost 4 layers and "outer layer" is defined as the outermost 4 layers. The two sets of inner leads 37A and 37B are located on the same end of the stator core (i.e., the weld end 28), but on opposite sides of the stator core. In particular, the two sets of inner leads 37A and 37B are positioned substantially 180° from one another on opposing sides of the stator core. As a result, the same number of slots are positioned between the inner leads 37A and 37B in either circumferential direction (i.e., 24 slots in either circumferential direction between inner lead set 37A and inner lead set 37B). Similarly, the two sets of outer leads 38A and 38B are also located on the same end 28 of the stator core, and are positioned on different sides of the stator core, opposite one another. In particular, the two sets of outer leads 38A and 38B may be positioned 180° from one another on opposing sides of the stator core. As a result, the same number of slots are positioned between the outer leads 38A and 38B in either circumferential direction (i.e., 24 slots in either circumferential direction between outer lead set 38A and outer lead set 38B).

Figure 4:
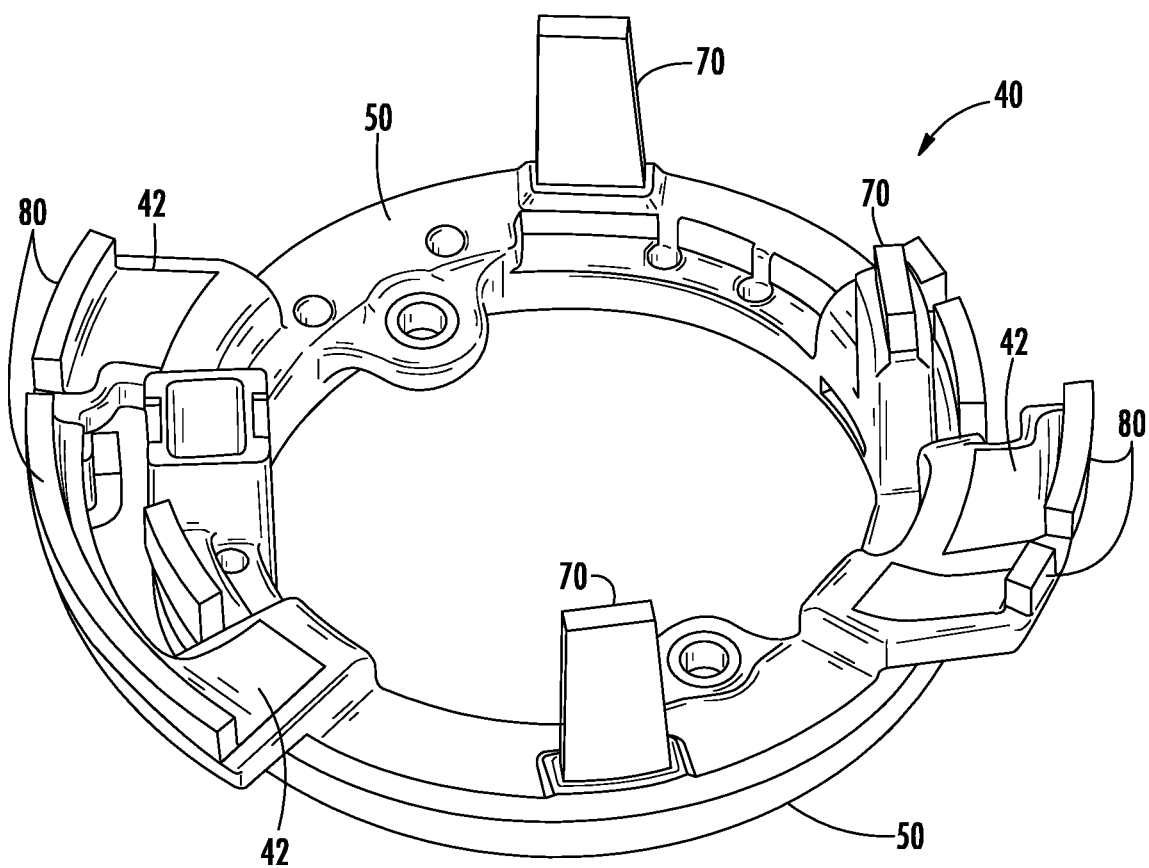
FIG. 4 shows a perspective view of the bus bar assembly of FIG. 1 in isolation, including a plurality of bus bars retained within and an encasement.
Figure 5:
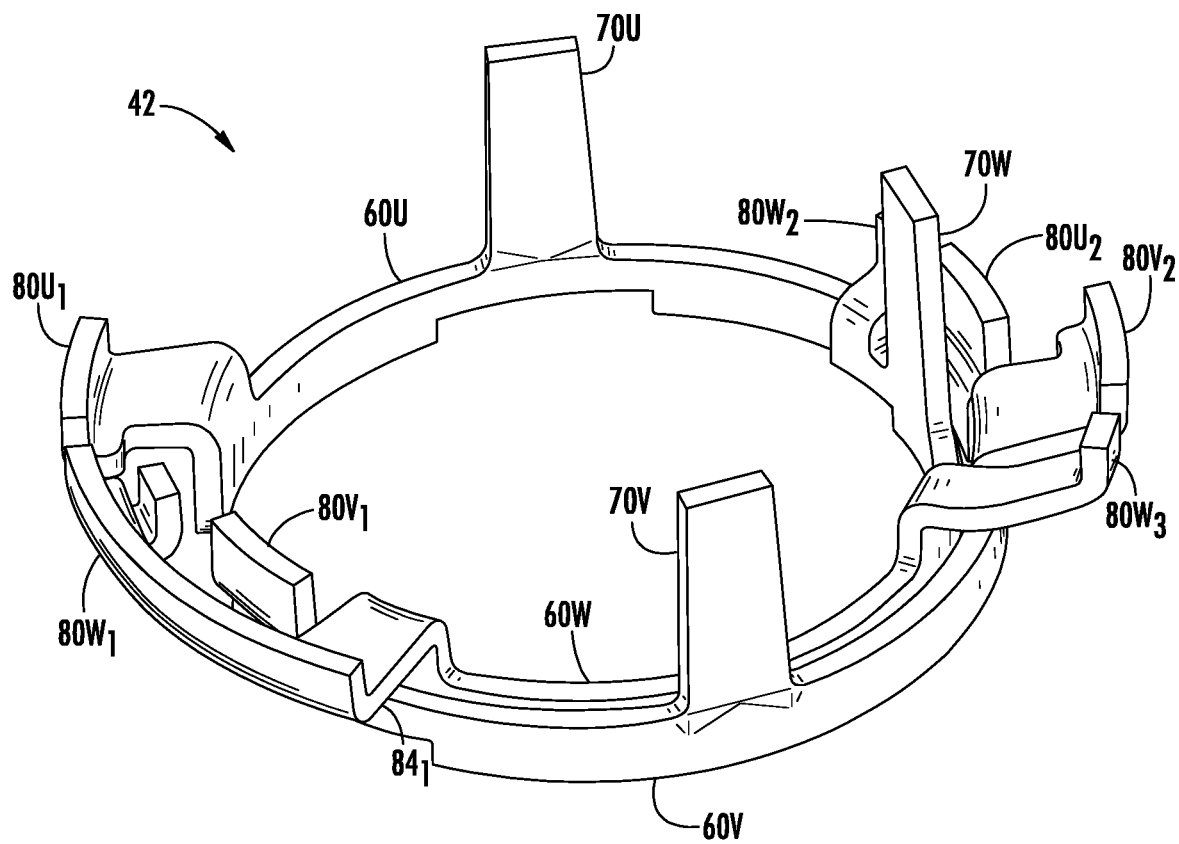
FIG. 5 shows a perspective view of the bus bar assembly of FIG. 4 with the encasement removed to expose the plurality of bus bars.

With reference now to FIG. 4, the bus bar assembly 40 is shown in isolation from the stator assembly 12. The bus bar assembly 40 is substantially circular in shape and is provided as a complete or partially complete ring or disc-like member. As such, the shape of the bus bar assembly 40 generally resembles the circular cross-sectional shape of the stator core. The bus bar assembly 40 includes three bus bars 42 all embedded within an encasement 50 with each individual bus bar separated from the two other bus bars. The encasement 50 is comprised of an electrically insulating polymer material that is molded around each of the three bus bars 42. As a result, the encasement 50 not only holds the three bus bars 42 in place but also serves as an electrical insulator to prevent current from flowing between the bus bars. The encasement 50 renders the bus bar assembly 40 a unitary component wherein the individual bus bars may not be removed from the assembly 40 without destruction of the encasement 50.

With reference now to FIGS. 5-8, the three bus bars 42 include a first bus bar 42U, a second bus bar 42V, and a third bus bar 42W. It will be recognized that the designations of U, V and W are used herein for the sake of convenience to distinguish each of the three different bus bars. When the winding is a Y-connected winding, each of the bus bars 42 is associated with a winding node connected to only one phase of the Y-connected winding (i.e., one of phases U, V or W). However, when the winding is a Δ-connected winding, each of the bus bars 42 is associated with a winding node/line that is connected between two phases of the winding (i.e., connected between phases U and V, between phases U and W, or between phases V and W). Accordingly, while the designations 42U, 42V and 42W are used herein to distinguish the three bus bars 42, the bus bars may alternatively be referred to herein with the designations $42_{L1}$, $42_{L2}$, and $42_{L3}$ to more accurately represent a line (i.e., L1, L2 or L3) that each bus bar is associated instead of a phase (i.e., U, V or W).

With continued reference to FIGS. 5-8, each bus bar 42U, 42V and 42W includes an arc member 60 (respectively, 60U, 60V or 60W), a phase terminal 70 (respectively, 70U, 70V or 70W), and at least two lead connectors 80 (respectively, $80U_1$, $80U_2$, $80V_1$, $80V_2$, $80W_1$, $80W_2$ or $80W_3$). As explained in further detail below, the lead connectors 80 are directly coupled to the winding leads 36. The arc members 60 extend between and electrically connect the lead connectors 80 to the phase terminals 70. The phase terminals 70 are configured to easily couple the electric machine to other electrical components, such as an inverter (not shown) when the electric machine is configured as a motor, or a rectifier (not shown) when the electric machine is configured as a generator.

Figure 6:
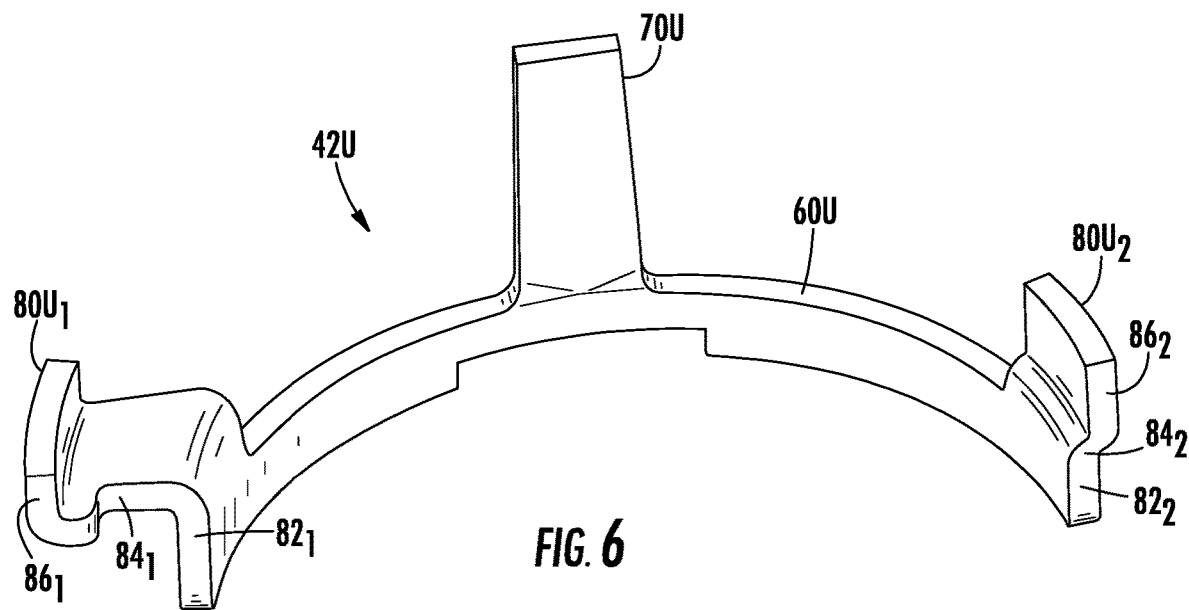
FIG. 6 shows a perspective view of a first bus bar of the bus bar assembly of FIG. 4 in isolation.

With particular reference to FIG. 6, the first bus bar 42U includes an arc member 60U, a phase terminal 70U, a first lead connector $80U_1$ connected to a first end of the arc member 60U, and a second lead connector $80U_2$ connected to a second end of the arc member 60U. The various components of the first bus bar 42U are integrally formed such that the first bus bar 42U is unitary in construction. The material that forms the first bus bar 42U is characterized by good electrical conductivity, such as copper or other electrically conductive metal materials.

The arc member 60U of the first bus bar 42U is provided by a curved bar-like structure with a generally rectangular cross-sectional shape. However, it will be appreciated that the arc member 60U may be provided in various other shapes and forms. For example, the arc member 60U may have a square or circular cross-sectional shape. In the embodiments shown herein, the arc member 60U is a generally arc defined by a circle having a center on the center axis 20. However, in other embodiments, the arc member 60U may not be provided in the form of a arc, but may be comprised of one or more segments that result in a bus bar that extends the desired amount of degrees around the stator core (e.g., a series of liner segments with relatively large obtuse angles defined by pairs of the segments). In at least some embodiments the arc member 60U extends between 90° and 270° along the inner perimeter surface 22 of the stator core. In at least one desirable embodiment, the arc extends about 180° (i.e., between 170° and 190°).

The phase terminal 70U extends axially from a central location on the arc member 60U. In the disclosed embodiment, the phase terminal 70U is provided as a monolith having a similar thickness as the arc member 60U, but a significantly greater height (e.g., the phase terminal 70U extends three to four times higher than the arc member 60U). The height of the phase terminal 70U allows it to extend significantly past the end turns 34 when the bus bar assembly 40 is positioned on the stator assembly 12, thus allowing for an easy and convenient connection to the phase terminal 70. The phase terminal 70U extends axially from a central location on the arc member 60U that is between the first lead connector $80U_1$ and the second lead connector $80U_2$.

The first lead connector $80U_1$ is provided by an arm that extends axially and radially away from a first end of the arc member 60U. In particular, the first lead connector $80U_1$ is defined by three general segments that form an arm having "S-like" shape. These three segments include a first segment 82 that extends axially away from the arc member 60U, a second segment 84 that extends radially outward from the arc member 60U and the first segment $82_1$, and a third segment $86_1$ that extends axially away from the second segment. The first segment $82_1$ defines a proximal end of the lead connector $80U_1$ that is directly connected to the arc member 60U. The second segment $84_1$ defines an intermediate portion of the lead connector $80U_1$ that is configured to extend a significant radial distance over the end turns of the windings 30 (the term "over" is used in this context in association with the axial direction being an upright orientation, similar to the orientation of FIG. 1). The third segment $86_1$ defines a distal end of the lead connector $80U_1$ that extends further in the axial direction. This third segment $86_1$ provides an arc-shaped rim with a curved outer circumferential surface. This outer circumferential surface is configured to abut one or more leads 36 of the winding such that the leads may be welded or otherwise connected to the first lead connector $80U_1$. As explained in further detail below, because the second segment $84_1$ is relatively long, the third segment $86_1$ is configured to be connected to leads 36 associated with an outer layer of the windings 30.

The second lead connector $80U_2$ is provided by an arm that extends axially and radially away from a second end of the arc member 60U that is opposite the first end (i.e., on an opposite side of the bus bar from the first end). The shape of the second lead connector $80U_2$ is similar to that of the first lead connector $80U_1$, including a first segment $82_2$, a second segment $84_2$ and a third segment $86_2$. However, in the second lead connector $80U_2$ the second segment $84_2$ that extends radially away from the arc member 60U is not as long as that of the first lead connector $80U_1$. Similar to the first lead connector $80U_1$, the outer surface of the third segment $86_2$ of the second lead connector $80U_2$ is configured to abut one or more leads of the winding such that the leads may be welded or otherwise connected to the second lead connector $80U_2$. Because the second segment $84_2$ is relatively short, the third segment $86_2$ is configured to be connected to leads 36 associated with an inner layer of the windings 30.

Figure 7:
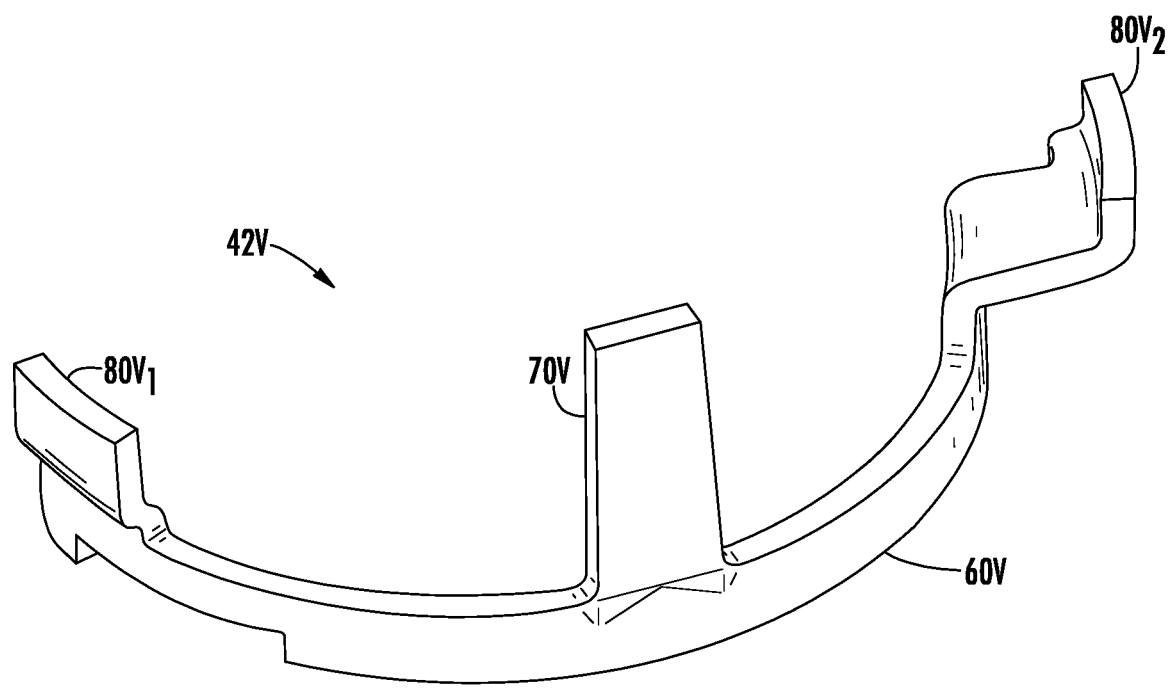
FIG. 7 shows a perspective view of a second bus bar of the bus bar assembly of FIG. 4 in isolation.

With particular reference to FIG. 7, the second bus bar 42V is shown. The second bar bus 42V includes an arc member 60V, a phase terminal 70V, a first lead connector $80V_1$, and a second lead connector $80V_2$. The arrangement and components of the second bus bar 42V are substantially similar to that of the first bus bar 42U. Accordingly, a more detailed description of the second bus bar 42V is not repeated herein for the sake of brevity.

Figure 8:
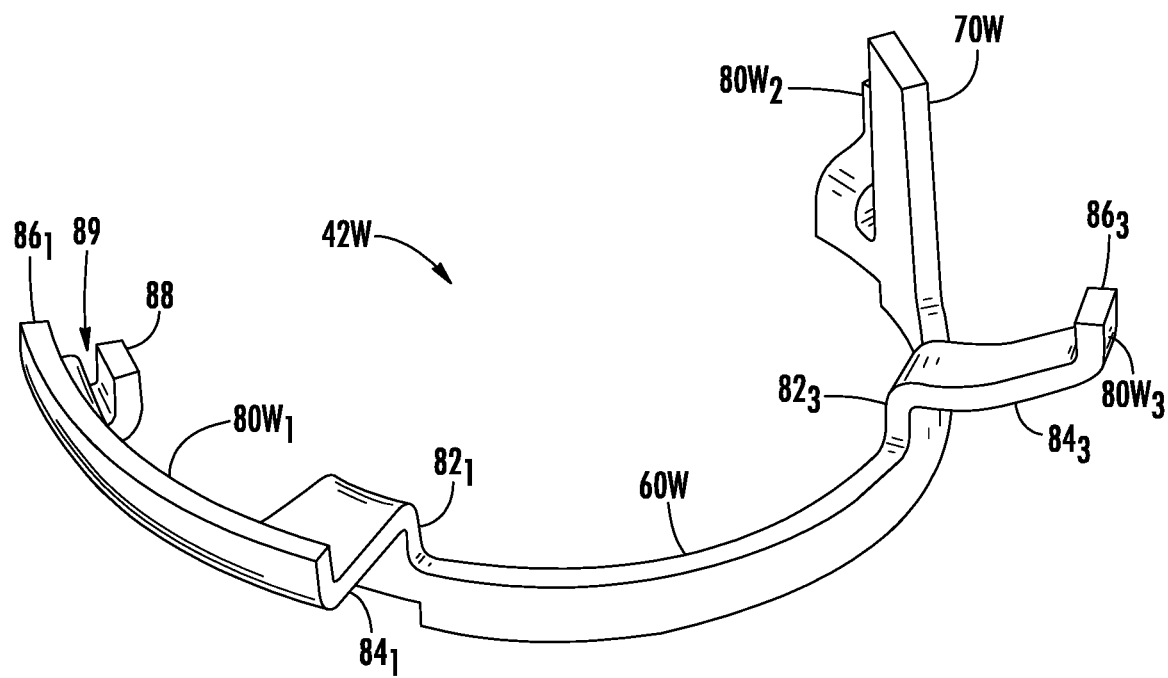
FIG. 8 shows a perspective view of a third bus bar of the bus bar assembly of FIG. 4 in isolation.

With particular reference now to FIG. 8, the third bus bar 42W includes an arc member 60W, a phase terminal 70W, a first lead connector $80W_1$ connected to a first end of the arc member 60W, a second lead connector $80W_2$ connected to a second end of the arc member 60W, and a third lead connector $80W_3$ connected to the arc member 60W at a more central location of the arc member 60W. Similar to the other bus bars 42U and 42V, the various components of the third bus bar 42W are integrally formed such that the bus bar 42W is unitary in construction. The material that forms the bus bar 42W is also characterized by good electrical conductivity, such as copper or other electrically conductive metal materials.

The arc member 60W of the third bus bar 42W is similar to that of the other bus bars and is provided by a curved bar-like structure with a generally rectangular cross-sectional shape. Also, the phase terminal 70W is similar to that of the other bus bars and extends as a monolith axially from the arc member 60W. However, on the third bus bar 42W, the phase terminal 70W is provided on the second end of the bus bar 42W, between the second lead connector $80W_2$ and the third lead connector $80W_3$.

With continued reference to FIG. 8, the first lead connector $80W_1$ of the third bus bar 42W is provided by an arm that extends axially and radially away from the arc member 60W at a first end of the arc member 60U. In particular, the first lead connector $80W_1$ is defined by three general segments that form an arm having "S-like" shape. These three segments include a first segment $82_1$ that extends axially away from the arc member 60W, a second segment $84_1$ that extends radially outward from the arc member 60W and the first segment $82_1$, and a third segment $86_1$ that extends axially away from the second segment. The first segment $82_1$ defines a proximal end of the lead connector $80W_1$ that is directly connected to the arc member 60W. The second segment $84_1$ defines an intermediate portion of the lead connector $80W_1$ that is configured to extend over the end turns of the windings 30 to leads associated with an outer layer of the winding. The third segment $86_1$ defines a distal end of the lead connector $80W_1$ that is configured to be connected to one or more winding leads 36. The third segment $86_1$ has an extended arc shape (e.g., an arc extending significantly further in a circumferential direction than either of the first segment $82_1$ or the second segment $84_2$). This extended arc shape provides an outer rim portion of the third lead connector $80W_1$ with a curved outer circumferential surface. The curved outer circumferential surface is configured to abut one or more leads 36 associated with an outer layer of the winding. The third segment also includes an inner rim portion 88 having an arc shape with a curved inner circumferential surface. This curved inner circumferential surface is configured to abut one or more leads 36 associated with the inner layer of the winding. A groove 89 separates the inner rim 88 from the outer rim $86_1$.

The second lead connector $80W_2$ of the third bus bar 42W is provided by an arm that extends axially and radially away from the arc member 60W at a second end of the arc member 60W. The shape of the second lead connector $80W_2$ is similar to other of the previously described lead connectors having a relatively short second segment that allows the second lead connector $80W_2$ to be connected to leads associated with an inner layer of the winding.

The third lead connector $80W_3$ of the third bus bar 42W is provided by an arm that extends axially and radially away from the arc member 60W at a more central location near the second end of the arc member 60W. The shape of the third lead connector $80W_3$ is similar to other of the previously described lead connectors and includes an axial first segment $82_3$, a radial second segment $84_3$, and an axial third segment $86_3$. The radial second segment $84_3$ is relatively long and allows the third lead connector $80W_3$ to be connected to leads associated with an outer layer of the winding.

With reference again to FIG. 5, the three bus bars 42U, 42V and 42W are arranged within the bus bar assembly 40 such that their arc members 60 collectively form a ring that extends at least 300° around the generally circular assembly (i.e., the span of the first arc member plus the second arc member is at least 300°). In this arrangement, the first bus bar 42U and the second bus bar 42V are positioned on opposite sides of the bus bar assembly 40 and are concyclic because both arc members 60U and 60V lie in a common outer ring that is substantially circular in shape. The arc member 60W of the third bus bar 42W is substantially circular in shape and is generally positioned on the same side of the bus bar 40 as the second bus bar 42V. However, the arc member 60W of the third bus bar 42W lies in an inner ring that is concentric with and radially inward from the outer ring where the second bus bar 42V lies. Accordingly, the arc member 60W of the third bus bar 42W may be considered to be concentric but not concyclic with the arc members 60U and 60V of both the first bus bar 42U and the second bus bar 42V. As shown in FIG. 4, the arc members 60 of the three bus bars 42 are covered by the encasement. The phase terminals 70 and lead connectors 80 all extend axially and/or radially away from the encasement 50.

As noted previously, it will be recognized that the bus bars 42 may be configured in a number of different ways in order to provide a bus bar assembly for any number of different winding arrangement. For example, the bus bars 42 may be configured for use with a Y-winding arrangement, wherein bus bar 42U provides the line leading to the U phase, bus bar 42V provides the line to the V phase, and bus bar 42W provides the line to the W phase. Alternatively, the configuration of the bus bars 42 in FIGS. 5-8 may be used in association with a delta winding arrangement. In this configuration, the first bus bar 42U provides the node/line between the U and the V phases, the second bus bar 42V provides the node/line between the V and W phases, and the third bus bar 42W provides the node/line between the W and U phases. As another example, the shape, position and arrangement of the terminals 70 and lead connectors 80 of each bus bar may be adapted to fit different winding configurations having different numbers winding leads.

Figure 9:
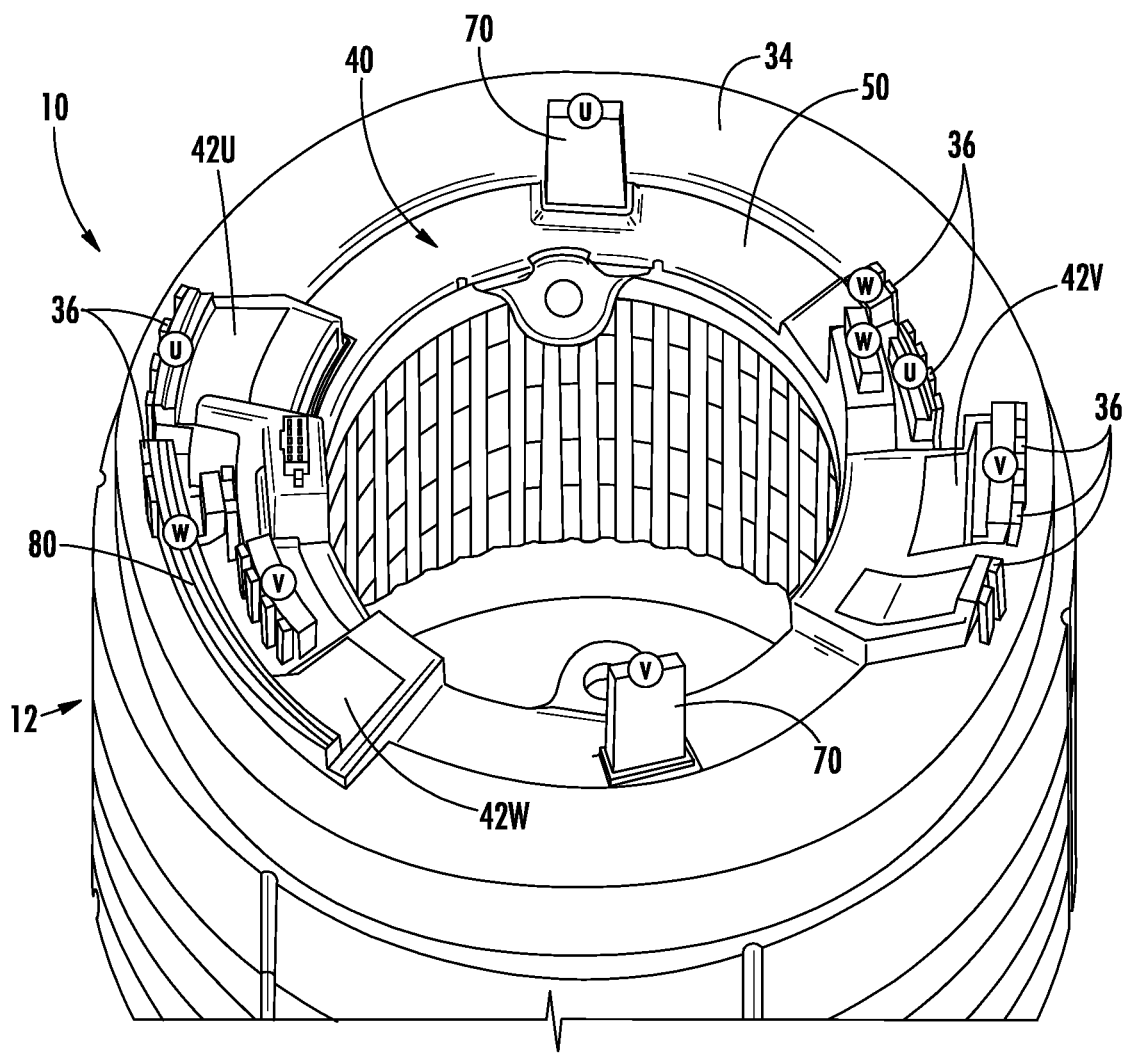
FIG. 9 shows a perspective view of the bus bar assembly of FIG. 4 positioned on the stator assembly with lead connectors of the bus bar coupled to the leads of the phase winding.

FIG. 9 shows the complete bus bar assembly 40, including the bus bars of FIGS. 5-8 coupled to the winding arrangement of FIG. 3 on a stator assembly 12. In FIG. 9, the phase terminals 70 and lead connectors 80 of each of the three bus bars 42 are shown with an indicia (i.e., a circled U, V or W) on their tip portions in order to better illustrate the exposed components associated with of different bus bars (i.e., 42U, 42V and 42W). As noted previously, the winding arrangement of FIG. 3 is a delta arrangement. Accordingly, in FIG. 9, the first bus bar 42U provides the node/line between the U and the V phases, the second bus bar 42V provides the node/line between the V and W phases, and the third bus bar 42W provides the node/line between the W and U phases.

As shown in FIG. 9, the encasement 50 containing the arc members 60 of the bus bar assembly 40 is positioned within the boundaries of the winding end turns 34. Accordingly, all of the arc members 60 of the bus bar assembly 40 are located radially inside of the end turns 34 and axially inside of with the tips of the end turns 34 (e.g., in the embodiment of FIG. 2, below the plane 90 that sits on the top of the end turns 34).

While the arc members 60 of the bus bar assembly are positioned within the boundaries of the end turns 34, other portions of the bus bar assembly 40 extend outside of these boundaries. For example, all of the lead connectors 80U, 80V, 80W extend to axial positons that are beyond the end turns 34 (e.g., above the plane 90 in FIG. 2). Some of the lead connectors 80U, 80V and 80W also extend to radial positions past the inner diameter defined by the end turns (e.g., these lead connectors extend past the inner diameter (ID) boundary and over the end turns 34 in FIG. 2). These are the lead connectors 80 that are joined to leads 36 associated with an outer layer of the windings (e.g., outer lead sets 38A and 38B in FIG. 2). In contrast, other lead connectors 80 remain substantially parallel with the ID boundary. These are the lead connectors 80 that are joined to the leads 36 associated with an inner layer of the windings (e.g., inner lead sets 37A and 37B in FIG. 2).

As will be appreciated from the illustration of FIG. 9, each of the bus bars 42 connects leads 36 on one side of the stator assembly 12 to leads on an opposite side of the stator assembly. For example, the bus bar 42U connects leads 36 shown on the left side of the stator assembly 12 of FIG. 9 to leads 36 on the opposing right side of the stator assembly 12. Accordingly, phase terminal 70U provides a connection to phase leads on both the left and right sides of the winding. Similarly, bus bars 42V and 42W also connect leads on the left and right sides of the winding and include a phase terminal that provides a connection to the leads on opposing sides of the winding.

The foregoing detailed description of one or more embodiments of the stator winding connection arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:
1. An electric machine comprising:
   a stator assembly including a core with windings positioned on the core, the windings including in-slot portions, end turns, and leads, the in-slot portions positioned in slots of the core, the end turns extending from the in-slot portions at ends of the core, and the leads extending from the in-slot portions at one of the ends of the core with ends of the leads extending axially past the end turns, the leads including a first plurality of leads positioned on a first side of the stator assembly and a second plurality of leads positioned on a second side of the stator assembly; and
   a substantially circular bus bar assembly positioned radially inward from the end turns, the bus bar assembly including three bus bars, each bus bar connecting at least one of the first plurality of leads to at least one of the second plurality of leads.

2. The electric machine of claim 1 wherein the first plurality of leads on the first side of the stator assembly are positioned substantially 180° from the second plurality of leads on the second side of the stator assembly.

3. The electric machine of claim 2 wherein the first plurality of leads include a first set of inner leads and a first set of outer leads, wherein the second plurality of leads include a second set of inner leads and a second set of outer leads, wherein the first set of inner leads are positioned substantially 180° from the second set of inner leads, and wherein the first set of outer leads are positioned 180° from the second set of outer leads.

4. The electric machine of claim 1 wherein a first bus bar includes an arc member, two lead connectors positioned at opposite ends of the arc member, and a first phase terminal.

5. The electric machine of claim 4 wherein a second bus bar includes an arc member, two lead connectors positioned at opposite ends of the arc member, and a second phase terminal, wherein the arc member of the first bus bar and the arc member of the second bus bar are concyclic, are positioned on opposite sides of the bus bar assembly, and together span at least 300°.

6. The electric machine of claim 5 wherein a third bus bar includes an arc member, three lead connectors with one lead connector on one end of the arc member and two lead connectors on another end of the arc member, and a third phase terminal, wherein the arc member of the third bus bar and the arc member of the second bus bar are concentric and positioned on a same side of the bus bar assembly.

7. The electric machine of claim 6 wherein the arc member of the third bus bar is positioned radially inward from the arc member of the second bus bar, and wherein the lead connectors of the third bus bar extend radially outward and over the arc members of the first bus bar and the second bus bar.

8. The electric machine of claim 1 wherein the windings are three phase windings, wherein the leads include eight leads associated with a first phase, eight leads associated with a second phase, and eight leads associated with a third phase, and wherein each lead is associated with either an inner winding layer or an outer winding layer.

9. The electric machine of claim 1 wherein each of the three bus bars includes an arc member, a phase terminal, a first lead connector, and a second lead connector, the arc member positioned radially inward from the end turns, the first lead connector extending radially outward from the arc member and connected to the at least one of the first plurality of leads, the second lead connector extending radially outward from the arc member and connected to the at least one of the second plurality of leads, and the phase terminal extending axially from the arc member between the first lead connector and the second lead connector.

10. The electric machine of claim 7 wherein the three bus bars include a first bus bar, a second bus bar, and a third bus bar, wherein the third bus bar further includes a third lead connector on a same end of the arc member as the second lead connector, the phase terminal of the third bus bar provided between the second lead connector and the third lead connector, wherein the first lead connector of the third bus bar includes an outer rim portion and an inner rim portion, the outer rim portion providing the first lead connector and the inner rim portion providing a fourth lead connector.

11. The electric machine of claim 6 wherein the first phase terminal is positioned between the two lead connectors of the first bus bar.

12. The electric machine of claim 11 wherein the second phase terminal is positioned between the two lead connectors of the second bus bar.

13. The electric machine of claim 11 wherein the third phase terminal is positioned between the lead connector on one end of the arc member and the two lead connectors on the other end of the arc member.

14. An electric machine comprising:
a stator assembly including a core with windings positioned on the core, the windings including in-slot portions, end turns, and leads, the in-slot portions positioned in slots of the core, the end turns extending from the in-slot portions at ends of the core, and the leads extending from the in-slot portions at one of the ends of the core with ends of the leads extending axially past the end turns;
a first bus bar including an arc member, a first phase terminal, a first lead connector, and a second lead connector;
a second bus bar including an arc member, a second phase terminal, a first lead connector, and a second lead connector, wherein the arc member of the second bus bar is concyclic with the arc member of the first bus bar; and
a third bus bar including an arc member, a third phase terminal, a first lead connector, and a second lead connector, wherein the arc member of the third bus bar is radially separated from but concentric with the arc members of the first bus bar and the second bus bar.

15. The electric machine of claim 14 wherein the arc members of the first bus bar, the second bus bar, and the third bus bar are all positioned within an encasement that electrically insulates each bus bar from the others, and wherein the phase terminals and the lead connectors all extend axially from the encasement.

16. The electric machine of claim 15 wherein the encasement forms a disc shape, and the arc member of the first bus bar and the arc member of the second bus bar together extends at least 300°.

17. The electric machine of claim 16 wherein the first phase terminal, the second phase terminal, and the third phase terminal each extend in an axial direction from the encasement and are positioned 30° to 120° apart from each other.

18. The electric machine of claim 14 wherein the first lead connector and the second lead connector associated with each bus bar are each provided by an arm that extends axially away and radially outward from the associated arc member, wherein each arm includes a first axial portion defining a proximal end of the arm directly coupled to the associated arc member, a second axial portion defining a distal end of the arm, and a radial portion extending between the first axial portion and the second axial portion.

19. An electric machine comprising:
a stator assembly including a core with windings positioned on the core, the windings including in-slot portions, end turns, and leads, the in-slot portions positioned in slots of the core, the end turns extending from the in-slot portions at ends of the core, and the leads extending from the in-slot portions at one of the ends of the core with ends of the leads extending axially past the end turns;
a first bus bar positioned on a first side of a bus bar assembly, the first bus bar including an arc member, a first phase terminal, a first lead connector, and a second lead connector, the first lead connector provided on a first end of the arc member and extending radially outward from the arc member, the second lead connector provided on a second end of the arc member and extending radially outward from the arc member, and the first phase terminal extending axially from the arc member between the first lead connector and the second lead connector;

a second bus bar positioned on a second side of the bus bar assembly opposite the first side, the second bus bar assembly including an arc member, a second phase terminal, a first lead connector, and a second lead connector, the first lead connector provided on a first end of the arc member and extending radially outward from the arc member, the second lead connector provided on a second end of the arc member and extending radially outward from the arc member, and the second phase terminal extending axially from the arc member between the first lead connector and the second lead connector, wherein the arc member of the second bus bar is concyclic with the arc member of the first bus bar; and a third bus bar including an arc member, a third phase terminal, a first lead connector, and a second lead connector, the first lead connector provided on a first end of the arc member and extending radially outward from the arc member, the second lead connector provided on a second end of the arc member and extending radially outward from the arc member, and the third phase terminal provided on the second end of the arc member and extending axially from the arc member, wherein the arc member of the third bus bar is positioned radially inward from the arc member of the first bus bar and the second bus bar.

20. The electric machine of claim 19 wherein the third bus bar further includes a third lead connector provided on the second end of the arc member and extending radially outward from the arc member, the third phase terminal provided between the second lead connector and the third lead connector.

21. The electric machine of claim 20 wherein the first lead connector of the third bus bar includes an arm having an arcuate portion that is concentric with the arc member, the arcuate portion of the arm including defining outer rim and an inner rim with a groove provided between the outer rim and the inner rim.

22. The electric machine of claim 19 wherein the arc member of the first bus bar and the arc member of the second bus bar together extend at least 300°.

23. The electric machine of claim 19 further comprising a polymer material surrounding the arc member of the first bus bar, the arc member of the second bus bar, and the arc member of the third bus bar.

* * * * *